United States Patent [19]

Destannes et al.

[11] 4,199,228
[45] Apr. 22, 1980

[54] METHOD OF FABRICATION OF A LIQUID-DISPLAY CELL AND A CELL OBTAINED BY MEANS OF SAID METHOD

[75] Inventors: Louis Destannes, Eybens; Jacques Duchene, Grenoble; Robert Meyer, Gières, all of France

[73] Assignee: Commissariat a l'Energie Atomique, Paris, France

[21] Appl. No.: 909,116

[22] Filed: May 24, 1978

[30] Foreign Application Priority Data

Jun. 1, 1977 [FR] France .................. 77 16676

[51] Int. Cl.² .................. G02F 1/13
[52] U.S. Cl. ................ 350/320; 350/343; 350/363
[58] Field of Search .......... 350/331, 334, 343, 344, 350/357, 363, 320

[56] References Cited

U.S. PATENT DOCUMENTS

| | | | |
|---|---|---|---|
| 3,799,651 | 3/1974 | Janning | 350/334 |
| 3,808,497 | 4/1974 | Greeson et al. | 350/344 X |
| 3,995,940 | 12/1976 | Guyon et al. | 354/363 |
| 4,091,847 | 5/1978 | Sorkin | 350/331 X |
| 4,153,345 | 5/1979 | Duchene et al. | 350/363 |
| 4,156,559 | 5/1979 | Duchene et al. | 350/363 |
| 4,158,485 | 6/1979 | Mueller et al. | 350/343 |

Primary Examiner—Edward S. Bauer
Attorney, Agent, or Firm—Kerkam, Stowell, Kondracki & Clarke

[57] ABSTRACT

The method consists in forming a first insulating plate coated with an electrode, in depositing at the periphery of the plate a wall formed of a first material which is chemically inert with respect to the film and fusible at a first temperature, in passing through the wall a filler tube of a second material having a higher melting point than the wall, in forming a second transparent insulating plate coated with a semitransparent electrode, in sealing the tube in the wall and the first and second plates on the wall by heating the cell elements to a temperature at least equal to the first temperature and lower than the melting point of the second material, then in allowing the cell elements to cool.

8 Claims, 1 Drawing Figure

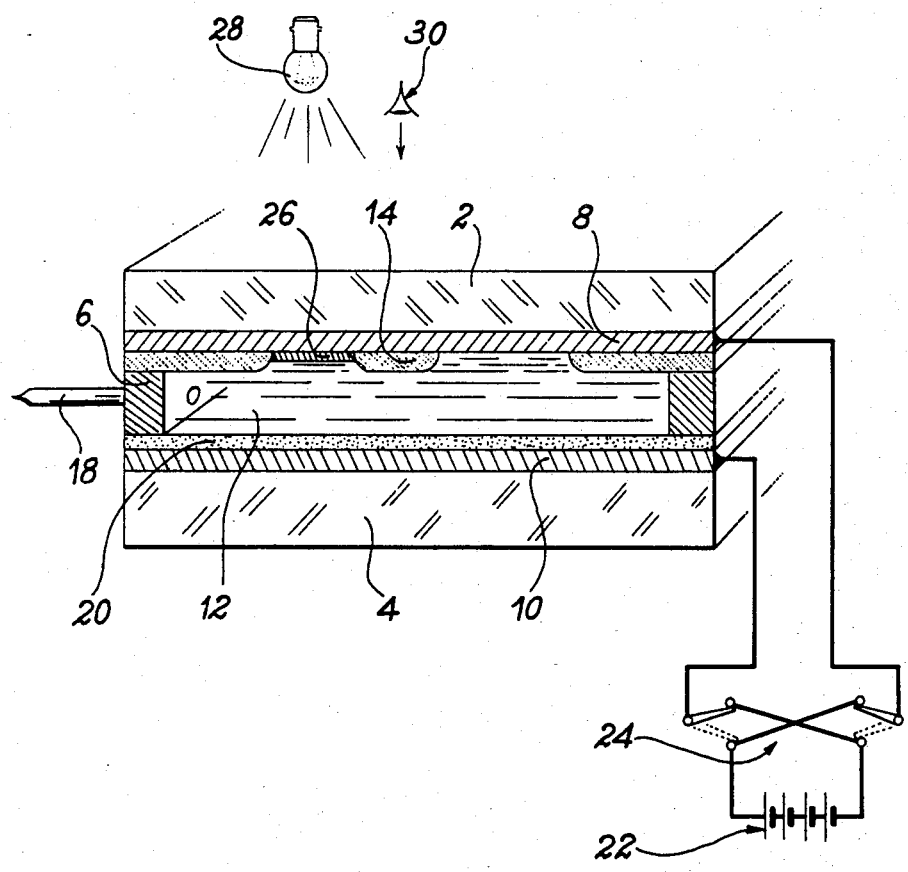

METHOD OF FABRICATION OF A LIQUID-DISPLAY CELL AND A CELL OBTAINED BY MEANS OF SAID METHOD

This invention relates to a method fabrication of a liquid-film display cell and to a cell obtained by means of said method.

The technical field to which the invention relates is the display of alphanumeric or analog characters.

It is known that a liquid-film display cell is usually constituted by two plates covered with electrodes and maintained in suitably spaced relation by a lateral wall. Different means are provided for varying the appearance exhibited by certain zones of the cell in order that alpha-numeric or other characters can be made to appear and disappear at will.

Known display cells of this type make use of a liquid crystal film to which is applied an electric field of well determined amplitude and frequency. Under the influence of this field, the liquid crystal molecules acquire particular orientations so that the desired signs can be made to appear by means of suitable lighting.

Another known type of display cell makes use of an electrolytic film. The electrochemical reactions which appear in the vicinity of one of the electrodes serve to deposit and dissolve reflecting or absorbent films. Relevant information on this subject can be obtained, for example, from the article by Salomon Zarcomb entitled "Theory and design principles of the reversible electroplating light modulator", published in the "Journal of the Electrochemical Society", October 1962, page 903.

The fabrication of devices of this type gives rise to a number of different problems. In the case of liquid crystal cells, the primary requirement is to obtain a constant thickness of liquid film since the applied electric field is dependent on this latter. Recourse is accordingly had to packing strips or shims on which the two plates are brought to bear. Leak-tightness of the liquid crystal cell does not present such a difficult problem and can readily be achieved by means of a peripheral seal applied around the cell. Further information on the subject of this technique can be obtained, for example, from French Pat. No. 2,163,858 filed on Dec. 3rd, 1971 and entitled "Improvements to visual display devices of the liquid crystal type and methods of fabrication of said devices".

In the case of electrolytic-film cells, the order of difficulties is reversed. In other words, the achievement of constant thickness is less critical whereas leak-tightness is of key importance. In fact, the solvents employed in the composition of the electrolytic film usually consist of products which are volatile at room temperature, have a high coefficient of expansion, are extremely fluid and liable to react chemically with a large number of organic compounds. This applies in particular to acetonitrile and methyl alcohol which are extensively employed in electrolytic display cells.

Under these conditions, it is difficult to obtain perfect leak-tightness over a very long period of time in a cell of this type. It is true to state that this problem has not been satisfactorily solved in the prior art.

In point of fact, the solutions proposed up to the present time in the case of electrolytic display cells are essentially as follows:

(a) Plug seals: These seals can be of two types:
  metallic plugs: the method consists in compressing a soft metal such as indium, lead or tin within a hole formed in one of the cell walls; these metals are dissolved in the electrolyte, however, thus modifying the composition of the solution;
  plugs of polyvinyl chloride or of teflon: These plugs afford good resistance to the chemical action of the electrolyte and of the vapor produced by this latter but are driven out under the action of pressure rises which are liable to take place within the cell at the time of heating of this latter.

(b) Sealing by means of adhesives: In the majority of instances, these adhesives consist of organic compounds which are also dissolved by the electrolyte. The use of these substances has the further disadvantage of entailing very long drying or polymerization times which are incompatible with the rate of evaporation of the solvent from the electrolyte;

(c) Sealing by means of cement: Certain types of quick-setting cement are constituted by mineral compounds which are chemically inert with respect to the electrolyte; they are nevertheless porous and consequently incapable of ensuring correct leak-tightness in the long term.

The precise aim of the present invention is to provide a method of fabrication of a display cell which makes it possible to obtain perfect leak-tightness even in the long term in the case of electrolytic-film cells. This method is of course applicable a fortiori to liquid crystal cells.

To this end, the method of fabrication in accordance with the present invention essentially consists:

in forming a first insulating plate coated with an electrode, in depositing at the periphery of said plate a wall constituted by a first material which is chemically inert with respect to said film and fusible at a first temperature, in placing on and through said wall at least one filler tube constituted by a second material having a higher melting point than said first temperature, in forming a second transparent insulating plate coated with a semitransparent electrode, in sealing the tube in the wall aforesaid and the first and second plates on said wall by heating the elements of the cell to a temperature at least equal to said first temperature and lower than the melting point of the second material, then in allowing the elements of the cell to cool.

In addition to the advantage provided by the improvement in leak-tightness of the cell, the method in accordance with the invention offers a second advantage in that the filling operation is facilitated by the presence of at least one tube mounted through the peripheral wall.

This invention also relates to a liquid-film display cell which is obtained by means of the method of fabrication defined in the foregoing.

The distinctive features and advantages of the present invention will in any case become more readily apparent from the following description of one examples of construction which is given by way of explanation without any limitation being implied, reference being made to the single accompanying FIGURE which is a diagrammatic sectional view of a liquid-film cell obtained by means of the method in accordance with the invention.

The cell which is illustrated in the FIGURE has two parallel plates 2 and 4, said plates being maintained in position by means of a peripheral wall 6 which forms a packing strip and ensures leak-tightness of the cell. The plate 2 is transparent and covered with a semi-transparent conductive deposit 8 which forms an electrode; the wall 4 is covered with a counter-electrode 10. A liquid film 12 is interposed between the plates 2 and 4. A layer 14 of insulating material serves to trace alphanumeric or other characters on the plate 2.

The cell which is illustrated further comprises a thin tube 18 or capillary tube having an internal diameter of a fraction of a millimeter, for example, and extending right through the wall 6 for the purpose of filling the cell. Said tube is sealed-off by melting at the outer end.

The cell can be provided in addition with a screen 20 which serves to mask the counter-electrode 10.

The electrode 8 and the counter-electrode 10 are connected to a direct-current voltage source 22 through a double switch 24 which serves to reverse the polarities of the voltages applied.

Electrochemical oxidation-reduction reactions cause deposition or dissolution (depending on the polarity) of a layer 26 on the electrode 8. By way of example, said layer can consist of an absorbent or reflecting metallic film.

The device is illuminated by a source 28 and observation takes place at 30.

Preferably, the wall 6 is formed in accordance with the invention by a fusible glass so that this latter can be joined to the two plates 2 and 4. Fusible glass is preferably also employed to form the tube 18 but has a melting point which is higher than that of the glass which forms the wall 6.

As can readily be understood, it would be possible to employ a fusible zone of only limited area in the wall 6 instead of forming the entire wall from said fusible material as shown in the FIGURE.

The thin tube 18 is advantageously located in a plane parallel to the plates 2 and 4 but could be either inclined or elbowed. Preferably, the outer end of the tube projects from the edge of the plates 2 and 4 over a distance of a few millimeters. Said outer end can be protected mechanically by being embedded in a drop of quick-setting adhesive or in any other suitable protective substance.

By way of explanation, in order to obtain a cell of this type, the operation is performed as follows:
  a bottom plate is first employed as a starting element, a counter-electrode formed of silver, for example, having already been deposited on said plate;
  a strip of fusible glass which is intended to form the lateral wall is deposited by screen process and has the consistency of a soft plate;
  a thin filler tube of ordinary glass is placed on said strip at right angles thereto in such a manner as to project outwards from the cell over a sufficient distance;
  the complete assembly is annealed in order to cause evaporation of the binder employed for the screen process (half an hour at 300°–350° C.);
  the complete assembly is heated to the melting point of the first fusible glass (500° to 550° C.) in order to form a seal with the thin tube;
  a top plate covered with an electrode is laid on the assembly and heated to the melting point of the first fusible glass (500° to 550° C.) during approximately quarter of an hour in order to form a seal between the wall and the top plate;
  the unit thus formed is allowed to cool and filled with electrolyte;
  intense and localized heating of the outer end of the thin tube is carried out for a short period of time (at a temperature of the order of 700° C.) in oder to seal-off said tube: there is thus no appreciable increase in temperature of the lateral wall of fusible glass and therefore no impairment of leak-tightness.

In an alternative form of said method:
  deposition of the fusible glass strip by screen process is replaced by positioning of fusible glass rods in accordance with the configuration desired;
  the thin tube is placed on the rod;
  the complete assembly is heated directly to the melting point of the fusible glass (450° C.) in order to form a seal between the lateral wall and the thin tube.

In regard to the cell-filling operation, the following procedure can be adopted:
  the cell fitted with a single filler tube is placed in a tank containing the electrolyte;
  the complete assembly is placed within a vacuum enclosure in order to remove the gas contained in the cell through the electrolyte;
  the vacuum is relased, normal pressure is restored and the liquid flows into the cell.

In a variant of this method of filling:
  the cell fitted with two thin filler tubes is introduced into a tank containing the electrolyte;
  the tube and the cell are in a condition of capillarity and the electrolyte accordingly penetrates into the cell.

After filling of the cell and prior to melting of the end of the tube 18, the liquid contained in said tube is discharged as follows: the temperature of the cell is slightly increased in order to cause expansion of the liquid, thus having the effect of driving a few drops of liquid through the tube. The cell is then allowed to cool, the liquid contracts and collects within the cell, thus leaving the tube empty.

In regard to the fusible glass which constitutes the peripheral wall 6, it is possible to employ for example:
  in the case of deposits formed by screen process, the glasses manufactured by Electro-Science Laboratories and designated by the reference 4011 C.
  in the case of the fusible rods, the glasses manufactured by Corning Glass and designated by the reference 7555 (sealing temperature: 450° C.; sealing time: 15 minutes).

As mentioned earlier, the display cell which is illustrated in the FIGURE can comprise a screen 20, the design function of which is to mask the counter-electrode 10 and to improve the apperance of displayed patterns or characters. This screen must have sufficient ionic conduction and be chemically inert with respect to the electrolyte. The use of a screen of this type is already known and was mentioned for example in French Pat. No. 2,170,525 filed on Dec. 21st, 1972 and entitled "Image reproducing cell".

However, the practical application of the method of fabrication in accordance with the invention gives rise to a particular problem in regard to said screen by reason of the temperature rise which is produced at the time of sealing of the peripheral wall on the plates and on the filler tube. In order to solve this difficulty, the invention provides for a particular form of construction of said screen. In accordance with the invention, the screen material is made up of two constituents: a powder of controlled particle size which provides a suitable porosity and an inorganic binder which ensures cohesion of the powder after drying. By way of example, said binder can be either hydrated silica or a fusible glass.

If the powder used for providing porosity does not have the desired color, it is possible to add one or a number of colored oxides to the initial mixture on condition that they are stable up to a temperature of approximately 500° C. which is the temperature at which the cell plates are welded.

Two examples can be given in order to illustrate the composition of the coating:

EXAMPLE 1—White coating

The powder is a titanium oxide ($TiO_2$) powder having a refractive index higher than 2.5 and ensures very good opacity.

The binder is a hydrated silica.

The proportions of the constituents (by volume prior to drying) can be: $TiO_2$ : 70%; hydrated silica: 30%.

EXAMPLE 2—Green coating

The powder is alumina ($Al_2O_3$).

The binder is hydrated silica.

The pigment is a chromium oxide $Cr_2O_3$.

The proportions of the constituents (by volume prior to drying) can be:

$Al_2O_3$: 65%;

Hydrated $SiO_2$: 30%;

$Cr_2O_3$: 5%.

In regard to the construction of said screen, this latter can be deposited on the counter-electrode by screen process prior to deposition of the fusible glass strip by screen process or positioning of fusible glass rods.

What we claim is:

1. A method of fabrication of a liquid-film display cell, wherein sad method consists:

in forming a first insulating plate coated with an electrode, in depositing at the periphery of said plate a wall constituted by a first material which is chemically inert with respect to said film and fusible at a first temperature, in placing on and through said wall at least one filler tube constituted by a second material having a higher melting point than said first temperature, in forming a second transparent insulating plate coated with a semitransparent electrode, in sealing the tube in the wall aforesaid and the first and second plates on said wall by heating the elements of the cell to a temperature at least equal to said first temperature and lower than the melting point of the second material, then in allowing the elements of the cell to cool.

2. A method according to claim 1, wherein a fusible glass is employed as first material.

3. A method according to claim 2, wherein said glass has a melting point of the order of 500° C.

4. A method according to claim 1, wherein a second fusible glass is employed as second material for forming the filler tube.

5. A method according to claim 1, wherein a filling operation is also performed and consists in immersing the outer end of the tube in a volume of said liquid, in withdrawing said tube when the cell has been filled, in heating the end of said tube to a temperature above the melting point of the second material and sealing-off said tube by melting.

6. A method according to claim 5, wherein the liquid contained in the tube is discharged therefrom prior to the end-melting operation by slightly increasing the temperature of the cell so as to cause expulsion of a few drops of liquid, the cell being then allowed to cool with the result that the liquid withdraws into said cell.

7. A method according to any one of claims 1 to 6, wherein deposition of a porous screen composed of a powder and of an inorganic binder is carried out on the first plate coated with its electrode prior to deposition of the peripheral wall.

8. A method according to claim 7, wherein the binder is hydrated silica.